United States Patent
Scriffignano et al.

(10) Patent No.: US 9,183,223 B2
(45) Date of Patent: Nov. 10, 2015

(54) SYSTEM FOR NON-DETERMINISTIC DISAMBIGUATION AND QUALITATIVE ENTITY MATCHING OF GEOGRAPHICAL LOCALE DATA FOR BUSINESS ENTITIES

(71) Applicant: THE DUN & BRADSTREET CORPORATION, Short Hills, NJ (US)

(72) Inventors: Anthony J. Scriffignano, West Caldwell, NJ (US); Warwick Matthews, Madison, NJ (US); Michael Klein, Chatham, NJ (US)

(73) Assignee: THE DUN & BRADSTREET CORPORATION, Short Hills, NJ (US)

( * ) Notice: Subject to any disclaimer, the term of this patent is extended or adjusted under 35 U.S.C. 154(b) by 0 days.

(21) Appl. No.: 14/213,949

(22) Filed: Mar. 14, 2014

(65) Prior Publication Data

US 2014/0280160 A1    Sep. 18, 2014

Related U.S. Application Data

(60) Provisional application No. 61/792,762, filed on Mar. 15, 2013.

(51) Int. Cl.
    *G06F 17/30* (2006.01)

(52) U.S. Cl.
    CPC .............................. *G06F 17/30241* (2013.01)

(58) Field of Classification Search
    CPC ........ G01C 21/20; G01C 21/26; G01C 21/36; G08G 1/20; G09B 29/106; G06F 17/30241
    USPC .......... 701/400, 454, 520; 707/707, 724, 737, 707/765
    See application file for complete search history.

(56) References Cited

U.S. PATENT DOCUMENTS

| | | | | |
|---|---|---|---|---|
| 7,324,666 B2* | 1/2008 | Zoken | ............... | G01C 21/32 382/100 |
| 7,373,244 B2* | 5/2008 | Kreft | ................... | G01C 3/08 340/988 |
| 7,606,581 B2* | 10/2009 | Riise | ............. | G06F 17/30241 455/446 |
| 7,606,582 B2* | 10/2009 | Riise | ................. | G06Q 30/02 455/456.1 |
| 7,616,964 B2* | 11/2009 | Riise | ............. | G06F 17/30241 455/432.3 |
| 8,050,689 B2* | 11/2011 | Riise | ............. | G06F 17/30241 382/113 |
| 8,442,716 B2* | 5/2013 | Epshtein | ....... | G06F 17/30241 30/32 |

(Continued)

OTHER PUBLICATIONS

International Search Report dated Aug. 22, 2014 for corresponding PCT Application No. PCT/US2014/029282, 2 pages.

(Continued)

*Primary Examiner* — Mary Cheung
*Assistant Examiner* — Atul Trivedi
(74) *Attorney, Agent, or Firm* — Ohlandt, Greeley, Ruggiero & Perle, L.L.P.

(57) ABSTRACT

There is provided a method that includes (a) receiving data that describes a location, (b) extrapolating, from the data, an address associated with the location, (c) identifying a segment of a thoroughfare that includes the address, (d) defining a polygon that has a perimeter that encompasses a geographic region that is in a vicinity of the segment, (e) obtaining geo-coordinates of a point within the polygon, (f) identifying an address at the geo-coordinates, and (g) identifying an entity that is associated with the address at the geo-coordinates. There is also provided a system that performs the method, and a storage device that contains instructions that control a processor to perform the method.

9 Claims, 3 Drawing Sheets

(56) References Cited

U.S. PATENT DOCUMENTS

| | | | |
|---|---|---|---|
| 2006/0253418 A1* | 11/2006 | Charnock | G06F 17/30716 1/1 |
| 2007/0150199 A1* | 6/2007 | Riise | G06F 17/30241 702/5 |
| 2008/0218401 A1* | 9/2008 | Loomis | G01S 19/09 342/66 |
| 2010/0076642 A1* | 3/2010 | Hoffberg | G05B 15/02 340/426.16 |
| 2010/0306287 A1* | 12/2010 | Raphaeil | G09B 29/106 707/919 |
| 2010/0318291 A1* | 12/2010 | Gluck | G01C 21/367 701/532 |
| 2011/0063432 A1 | 3/2011 | Di Bernardo et al. | |
| 2011/0179066 A1* | 7/2011 | Cardno | G06F 17/30 707/769 |
| 2011/0320319 A1* | 12/2011 | Streich | G06Q 30/06 705/27.1 |
| 2012/0109942 A1* | 5/2012 | Epshtein | G06F 17/30241 707/723 |
| 2012/0320089 A1 | 12/2012 | Kreft | |
| 2013/0035853 A1* | 2/2013 | Stout | G06T 17/05 701/438 |
| 2013/0050204 A1* | 2/2013 | Samokhin | G01C 21/3638 345/419 |
| 2014/0212029 A1* | 7/2014 | Rohlf | G06F 17/30241 382/154 |

OTHER PUBLICATIONS

International Search Report dated Aug. 22, 2014 for corresponding PCT Application No. PCT/US2014/029282, 5 pages.
International Preliminary Report on Patentability dated Mar. 16, 2015 for corresponding PCT Application No. PCT/US2014/029282, 7 pages.

\* cited by examiner

SYSTEM FOR NON-DETERMINISTIC DISAMBIGUATION AND QUALITATIVE ENTITY MATCHING OF GEOGRAPHICAL LOCALE DATA FOR BUSINESS ENTITIES

CROSS-REFERENCE TO RELATED APPLICATIONS

The present application is claiming priority of U.S. Provisional Patent Application Ser. No. 61/792,762, filed on Mar. 15, 2013, the content of which is herein incorporated by reference.

BACKGROUND OF THE DISCLOSURE

1. Field of the Disclosure

The present disclosure relates to a creation of new address-based business identification modalities, also referred to as capabilities, to define associations of businesses to a physical locale, using methods that are beyond standard address-related capabilities. In this case the term "modality" refers to the manner by which addresses that are defined differently, for example street number and name, latitude/lateral coordinates, or building name, can be associated to the same physical locale or location. This capability could be utilized in response to an inquiry, initiated by an end-user, a system, an application, or any other method, that is intended to identify business entities using address information which is comprised of one of more data fields, e.g., street name and number, as an inquiry attribute. This capability may be executed using different non-deterministic approaches including range, name, and polygon-based geospatial disambiguation as examples. In this context the term "non-deterministic" means the manner by which addresses will be defined in an inquiry, including the use of multiple manners using different data components referred to as flexible alternative indicia, and the approach by which they will be associated to physical locales, are not pre-determined and limited. The result of processing such an inquiry includes feedback that reflects inferred quality, modality of match, and other attributes to determine a connection of businesses to the inquiry address and associated physical locale.

An example of this capability would be to enable an association of a business to a locale that is different than the business's physical location and address, for example (a) a business in a shopping mall, which may be viewed as a horizontal physical location, (b) a business in a multi-story office building, which may be viewed as a vertical physical location, or (c) a business that is associated to a perimeter-based area, for example a specific tax lot.

2. Description of the Related Art

The approaches described in this section are approaches that could be pursued, but not necessarily approaches that have been previously conceived or pursued. Therefore, unless otherwise indicated, these approaches may not be prior art to the claims in this application and are not admitted to be prior art by inclusion in this section.

Efficient database access and searching capabilities are important for effective utilization of data that is maintained in referential databases. Crucial to this objective is an ability to enable efficient retrieval of a match result, i.e., a result of matching reference data to an inquiry that includes locale indicia, to identify and select match results in an efficient and effective manner, and to provide feedback that can be used to make decisions regarding the use of the match results.

Specific to identifying a business entity at a geographical locale, existing technology considers a specific and finite number of data fields, for example a registered, published or otherwise associated physical "street address" of the business entity. The existing technology is generally predicated on assumptions that a) business entity addresses, i.e., locale information, will be consistently represented, and b) that retrieval methodologies for a particular representation of a locale, such as a single street address for a multi-tenanted building, will necessarily be limited to retrieval of those candidates who share the above mentioned representation of the geographical locale. As an example, this existing technology is generally based on "street number+street name+city" heuristic comparisons, which yield opinions of accuracy based on (a) similarity of characters between an inquiry and a candidate, (b) number of characters matched or other basic correlative information after accounting for pre-defined orthographic variations, such as multiple ways of spelling a specific word including use of hyphenation, capitalization, word-breaks, punctuation, known abbreviations, and synonyms, or (c) other approaches used to compare data components. As a result, this existing technology may not result in a satisfactory result when a locale can be described in different ways, for example when one location may have multiple addresses.

As another example, the existing technology may use latitude and longitude to associate different addresses to the same physical locale. This may not result in a satisfactory result when a locale is spread over a wide geographic area, for example a shopping center or mall, and use of latitude/longitude as an identifier may associate incorrect entities that are not associated to the mall but are in the same geographic area.

SUMMARY OF THE DISCLOSURE

There is a need to improve existing search and match systems and methods, including (1) the process by which an inquiry is handled in order to curate and synthesize inquiry indicia to maximize the opportunity of identifying satisfactory candidates, (2) the process by which reference data as maintained on a database or series of databases is accessed, evaluated and utilized to identify candidate matches for the inquiry, (3) the process by which candidates are evaluated, selected, and prioritized, and (4) the process by which a match result and data regarding the match experience are provided to an inquirer or an inquiring system, including confidence indicators that describe a relative strength of the match to the inquiry, and attributes to indicate feedback on data used to propagate the match.

To fulfill these needs, there is provided a method that includes (a) receiving data that describes a location, (b) extrapolating, from the data, an address associated with the location, (c) identifying a segment of a thoroughfare that includes the address, (d) defining a polygon that has a perimeter that encompasses a geographic region that is in a vicinity of the segment, (e) obtaining geo-coordinates of a point within the polygon, (f) identifying an address at the geo-coordinates, and (g) identifying an entity that is associated with the address at the geo-coordinates. There is also provided a system that performs the method, and a storage device that contains instructions that control a processor to perform the method.

The present disclosure is a departure from the prior art in that an aim of the process disclosed herein is to identify those business entities which have as an attribute the inquiry locale, such identification to be based on values such as range, name and polygon-based geospatial disambiguation and flexible, alternative indicia where the incoming inquiry data is the description of a putative address entity ("locale") at which one or more business entities are located.

The present document discloses an automated system and method for differentiating among machine matches, i.e., matching reference data to an inquiry, without human intervention, thereby allowing for consistency and scalability, and allowing humans to focus on situations where insight or additional research is required to effect appropriate data stewardship. The term "scalability" means that this approach is not limited by a specific technology to technical solution.

The techniques described herein include capabilities that are not addressed by the prior art. Specifically, the techniques described herein provide flexibility in the access, retention, and use of high-value, predictive data elements or other derived indicia associated to a geographical locale, and that have previously been validated and aggregated into databases of locales and locale-specific characteristics, indicia or tokens, to be used through the match process. The techniques described herein allow such flexibility to be determined when data elements are made available to the database regarding the relative value of that data, and how that data will be used through the match experience in identifying matches and associated attributes that can be used by the end-user to make decisions regarding the use of that data and derived indicia.

DESCRIPTION OF THE DISCLOSURE

In the following several paragraphs, there are definitions of several terms being used herein.

Locale is a physical location, which may include multiple addresses described in different manners, and which may include addresses associated to an entity such as a business or residence, addresses on which there is no physical building or operational business, or combinations of physical locations.

Range is a manner of associating addresses based on geographic distance between physical addresses, such as "123-131 Main Street".

Name is a manner of identifying a business locale beyond standard address such as by building name, for example "1 New York Plaza" or "The Mall at Short Hills".

Polygon-based geospatial disambiguation is a manner of determining geographical proximity between multiple addresses using mathematical formulas and algorithms. This is the underlying concept behind geographic information systems (GIS) such as a global positioning system (GPS).

Perimeter-based area, which may also be referred to as segmentation, is an approach to associate different addresses to a common locale identifier, for example a housing complex or a business campus with multiple businesses, buildings, tax lots, open areas, or other similar units.

An identification modality is a manner of determining a degree of similarity between two different values, such as between an inquiry address based on street number and name, and an address that has a specific latitude and longitude. This includes both the data values themselves as well as metadata regarding those values. An example of metadata, which is descriptive data about data, in this case would indicate that an inquiry name and number is a street address.

Modality of match refers to different processes that can be executed to use data from an inquiry to identify data from a database or other source, using processes that are familiar to those experienced in the art; this may include "match", "search", "lookup", or other processes that associate an inquiry to a database or other source.

Indicia is a general term which refers to data. Alternative indicia are different data that may be used to identify a characteristic, for example "province" may be used as an alternative value for "state". Derived indicia are information that can be calculated or inferred from other data, for example latitude and longitude can be derived from street address, city, and state.

Flexible means that the type of indicia that is used to identify characteristics of an entity or an inquiry for entities may be different for different inquiries or entities.

Feedback is information about results of a match experience, such as the inferred quality and result of that experience. This feedback can be used to enable an end-user to make decisions regarding the consumption of the results of the experience.

Referential databases are repositories of data that have met quality-based criteria regarding data, for example data integrity, completeness, accuracy, and timeliness. The term "reference database" may relate to one or more such repositories.

Strategy is an approach for accepting an inquiry, utilizing inquiry data to identify candidates from a reference database, and providing candidates from that reference database that may be acceptable to an end-user.

The concept of "business" as used herein is exemplary of a type of entity at a locale. However, the present disclosure is not limited in the types of entities that may be of interest to the end-user; other examples include residential dwellings, tax lots, and open areas without any development.

The system described herein (a) receives an inquiry to initiate a search for an entity associated with a particular geographical locale, (b) uses the inquiry to determine a strategy to execute the search, (c) identifies candidate entities associated to the geographical locale, and (d) outputs the entities and related information regarding the process including the degree and quality of the candidates as they relate to the inquiry.

The examples described herein assume an inquiry that includes both entity name and address data. This is exemplary; this capability can be used to process an inquiry that includes only an address in order to identify other addresses associated to the inquiry address, or entities at the inquiry addresses and at other addresses that are associated to the inquiry address. Thus, an inquiry can include a name and address to find a specific business, or only an address to find multiple businesses at that address.

Figure 1A:
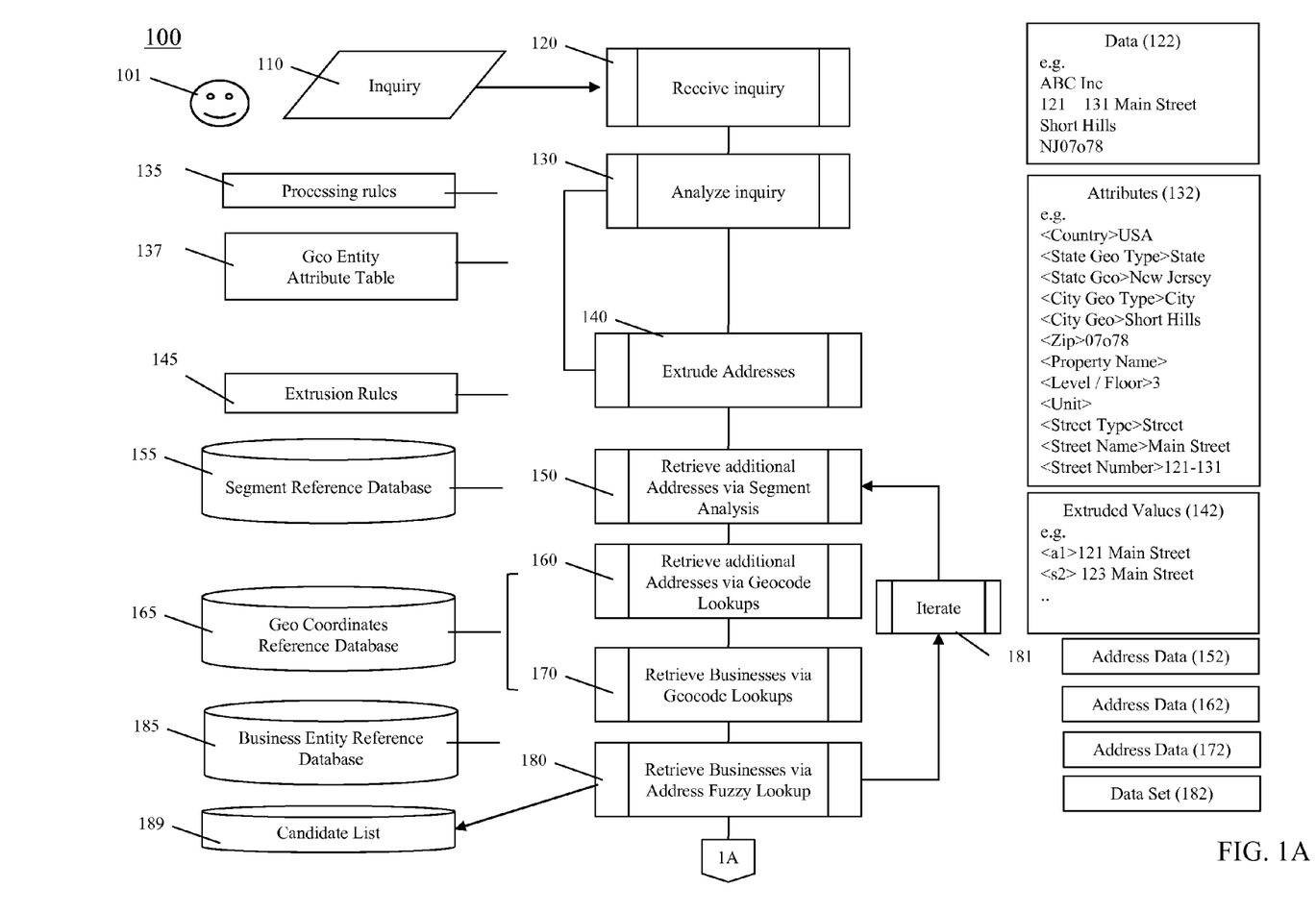
FIGS. 1A and 1B, together, are a flow diagram of a method that retrieves entities associated with a geographical locale.
Figure 1B:
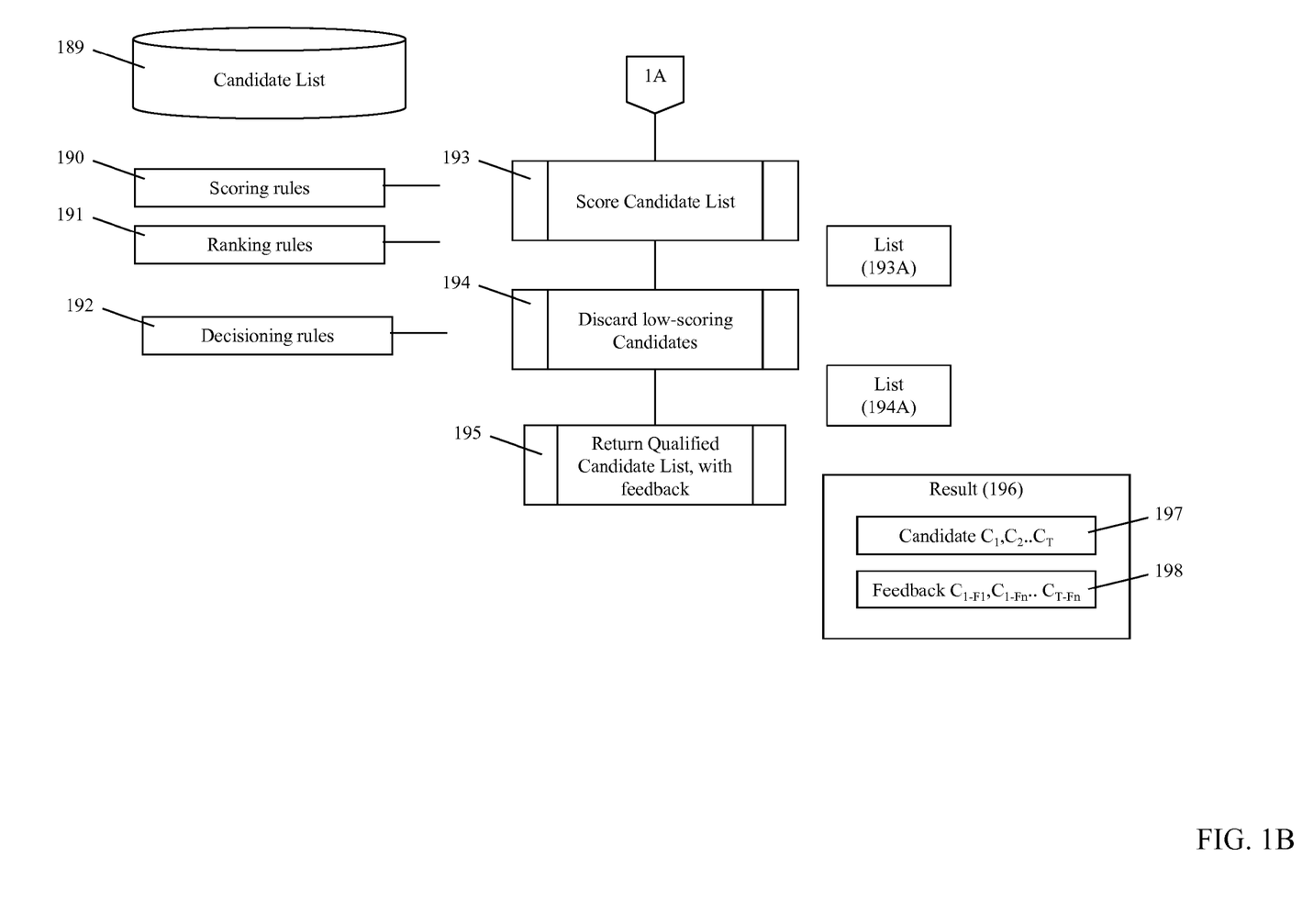

FIGS. 1A and 1B, together, are a flow diagram of a method 100 that retrieves entities associated with a geographical locale. FIG. 1A is connected to FIG. 1B by a connector labeled as "1A".

In brief, method 100 receives an inquiry 110 from a user 101, and executes processes 120, 130 and 140 to extract, generate, recognize and qualify locales and related entities that are then submitted for candidate retrieval using processes 150, 160, 170 and 180. This set of processes may retrieve multiple match records, which will then be de-duplicated and refined in process 181, and then qualitatively scored, both objectively and inter se, in processes 193 and 194. An output, i.e., a result 196, is generated and returned to user 101 in process 195.

Process 100 utilizes processing rules 135, a geo entity attribute table 137, extrusion rules 145, a segment reference database 155, a geo coordinates reference database 165, a business entity reference database 185, a candidate list 189, scoring rules 190, ranking rules 191 and decisioning rules 192.

Geo entity attribute table 137 is a table of recognizable attributes, i.e., data fields, which could be associated to data that can identify a geographical locale.

Extrusion rules 145 includes logic that is used to define specific viable addresses based on an input value, for example, in the US, addresses on one side of a street are all odd or even numbers.

Segment reference database 155 includes information related to a specific locale, for example to identify a contiguous section of road or other thoroughfare between significant waypoints such as intersecting streets.

Geo coordinates reference database 165 includes geospatial information as expressed as geographical coordinates, for example latitude and longitude, for specific addresses.

Business entity reference database 185 is a list of business entities that are associated to specific addresses.

Candidate list 189 includes a list of businesses from business entity reference database 185 that are physically located at the addresses and locales that are identified from geo coordinates reference database 165.

Scoring rules 190 include rules that are used to assign a qualitative score to each item on candidate list 189 based on its similarity to inquiry 110.

Ranking rules 191 includes rules that determine how items on candidate list 189 are ranked based on scores that are derived using scoring rules 190.

Decisioning rules 192 includes rules that determine which items from candidate list 189 should be presented to the user based on the rankings as derived from ranking rules 191.

Inquiry 110 is a request that initiates a search for information about a specific locale. The search will be based on indicia that are included in inquiry 110. Inquiry 110 includes a plurality of data elements that, in turn, include specific information regarding the locale in terms of data fields that are all, or a subset of, data fields which may have been requested from the end-user by a system or application that interfaces with process 100, and could also potentially include additional and virtually unlimited indicia regarding the locale. Inquiry 110 can be provided to method 100 by user 101, i.e., a human user or an automated process, for example as derived from files submitted using batch machine capabilities, or from an individual inquiry processed using online data entry screens. Inquiry 110 includes inquiry indicia that may be comprised of one of more data elements, for example inquiry indicia may be expressed as one concatenated field of street number, street name, and city, or separate data fields of (1) street number, (2) street name, and (3) city.

As an example inquiry 110 may include separate data fields with the information in TABLE 1.

TABLE 1

| Inquiry Indicia |
|---|
| ABC Inc 121-131 Main Street |
| Short Hills |
| NJ 07o78 |

Method 100 commences with process 120.

Process 120 receives inquiry 110, which includes data, i.e., inquiry indicia, that describes a location. Process 120 structures and interprets the inquiry indicia into a common format, i.e., data 122.

As an example, data 122 may include the information in TABLE 2.

TABLE 2

| Field | Inquiry Indicia |
|---|---|
| Name | ABC Inc |
| Street Address | 121-131 Main Street |
| City | Short Hills |
| State | NJ |
| Postal Code | 07o78 |

From process 120, method 100 progresses to process 130.

Process 130 analyzes data 122 to identify specific data fields that are associated with attributes in geo entity attribute table 137 in order to enhance an opportunity to identify matches from business entity reference database 185 by using those data fields singularly or in pluralities. As an example, this may separate street number (121-131) from street name (Main Street). In this regard, process 130 extracts, from data 122, attributes that are relevant to a search for candidates that are similar to the inquiry, thus yielding values for attributes 132.

As mentioned above, geo entity attribute table 137 is a table of recognizable attributes, i.e., data fields, that could be associated to data that can identify a geographical locale. Geo entity attribute table 137 includes data to assign a predictive weighting (K) to each attribute (x) to support a calculation of $K(x)$, where $K(x)$ is the predictive weighting of element x, as well as other information related to each attribute.

As an example, geo entity attribute table 137 may include the information in TABLE 3.

TABLE 3

| Field (x) | Predictive Weighting (K) |
|---|---|
| Name | 1 |
| Street Address Name | .7 |
| Street Address Number | .5 |
| Building Name | .8 |
| Suite Number | .3 |
| Floor Number | .4 |
| City | .6 |
| State | .9 |
| Postal Code | .5 |
| Country | 1 |

As an example attributes 132 may include the information in TABLE 4.

TABLE 4

| Field | Value |
|---|---|
| Business_Name | ABC Inc |
| Street_Name | Main Street |
| Street_Number | 121-131 |
| Building Name | <null> |
| Suite Number | <null> |
| Floor Number | <null> |
| City | Short Hills |
| State | NJ |
| Postal Code | 07o78 |
| Country | USA |

Process 130 uses processing rules 135 to analyze attributes 132, which may also provide input to formulate new business and metadata rules that thereafter are stored in processing rules 135, where a future execution of process 130 could utilize the new processing rules.

For example, a metadata rule may indicate that for a US address a 2-character field that is in capital letters is a state abbreviation, or that an alphabetic field that follows a number is a street name.

Processing rules 135 include automated and repeatable address entity and metadata rules based on standardization and normalization processes that include semantic and numeric disambiguation logic to interpret inquiry indicia for each component of an address. An example of processing rules 135 to standardize and normalize may include the information in TABLE 5.

TABLE 5

| Processing Rule | Impact |
|---|---|
| State | NJ = New Jersey |
| Address | For US entities street number precedes street name |
| Address component relationships | City name can be redundant across multiple states<br>Postal code is unique |

An example of a new rule for processing rules 135 may include the information in TABLE 6.

TABLE 6

| New Processing Rule | Impact |
|---|---|
| Businesses at 125 Main Street Short Hills NJ | DEF Corp is a new business operation for ABC Inc |
| Businesses at 125 Main Street Short Hills NJ | ABC Inc has reduced its business operations |
| Businesses at 125 Main Street Short Hills NJ | ABC Inc has leased unused space to a different business |

Processing rules 135 may also include information to cleanse, parse and standardize all components of attributes 132.

Cleansing involves removing extraneous values from data 122 such as punctuation and other forms of non-valuable characters, for example punctuation in street abbreviations or commas and line-feeds or carriage returns used as delimiters.

An example of a cleansing rule for processing rules 135 may include the information in TABLE 7.

TABLE 7

| Attribute 132 Value | Cleansed Value |
|---|---|
| 07o78 | 07078 (replace 'o' with '0') |

Parsing includes partitioning data 122 to increase the opportunity to identify matching and/or associated address entities for inquiry 110. This may include parsing inquiry indicia into separate data elements, for example, splitting an address into its constituent meaningful elements.

An example of a parsing rule for processing rules 135 may include the information in TABLE 8, which is showing how a concatenated value of a postal code and state is split into two separate values.

TABLE 8

| Attributes 132 Value | Parsed Value |
|---|---|
| NJ07o78 | NJ 07078 |

Standardizing includes associating alternative values to data 122 in order to increase the opportunity to identify matches.

An example of a standardization rule for processing rules 135 may include the information in TABLE 9.

TABLE 9

| Attributes 132 Value | Standardized Value |
|---|---|
| NJ | New Jersey |

Method 100 progresses from process 130 to process 140.

Process 140 uses extrusion rules 145 to process attributes 132, as combinations, collections and/or individual elements, to derive multiple potential address entities from original inquiry attributes 132, thus yielding extruded values 142. Thus, process 140 extrapolates, from attributes 132, one or more addresses associated with the location presented in inquiry 110. To extrapolate means to form an opinion or to make an estimate about something from known facts. The term "extrapolate" and the term "extrude" are used interchangeably herein. An example of an extrapolated address is the generation of "123 Main Street" from "121-131 Main Street". In this example, extrapolation is more than extraction of data from inquiry 110 and, for example, may also include further extrapolation of "140 Main street", resulting from analysis by process 140 of attributes 132, even though "140 Main Street" is neither explicitly enumerated in inquiry 110 (an example of explicit enumeration is "131 Main Street") nor inherently implied by it (an example of inherent implication is "123 Main Street").

Process 140 uses, for example, a heuristic algorithm-based calculation of the addresses inherent in a street address which is expressed as a range, and which provide guidance as to what addresses would be valid for the case, e.g., only odd numbers on the same side of certain streets. For example, since it is known that in the US, addresses on one side of a street are all either odd or even, and that two numbers separated by a dash indicates a start and end point, the heuristic algorithm-based calculation determines there are potentially other addresses that are between the start and end address, and that those addresses are all either odd or even based on whether the start and end addresses are odd or even. Extruded values 142 are additional inquiry indicia that can be used in process 170 to identify candidates from business entity reference database 185.

An example of an extrusion rule for extrusion rules 145 may include the information in TABLE 10.

TABLE 10

| Attributes 132 Value | Extrusion Rule | Potential Values |
|---|---|---|
| 121-131 Main Street | Standard US addressing includes use of add or even numbers on the same side of a street | 121 Main Street<br>123 Main Street<br>125 Main Street<br>127 Main Street<br>129 Main Street<br>131 Main Street |

Method 100 progresses from process 140 to process 150.

Process 150 receives extruded values 142, and identifies a segment of a thoroughfare that includes the address. That is, process 150, having reference to segment reference database 155, calculates an address segment (i.e., a contiguous section of road or other thoroughfare between significant waypoints such as crossroads, which will often themselves be the terminator of other segments) associated with each of the addresses contained in extruded values 142, and then retrieves from segment reference database 155 the address or addresses associated with each of those segments, and outputs them as address data 152, which now includes both street address data and geospatial location data such as longitude and latitude (this geospatial data is also referred to as "geocodes" or "geocode data"). Segment reference database 155 includes data that associates addresses by geographic area, also referred to as "perimeters" and the collection perimeter-based data is known as "perimeter reference data". In this regard, process 150 defines a polygon that has a perimeter that encompasses a geographic region that is in a vicinity of the segment.

An example of segment reference data within segment reference database 155 may include the information in TABLE 11.

polyhedron based on the first and second attributes, where the polygon is a cross-section of the polyhedron. An example of the definition of a polyhedron would be for process 150 to use the first attribute and the second attribute to construct the polyhedron to have an elevation calculated based on the maximum of the floor numbers associated with the segment.

Method 100 progresses from process 150 to process 160.

Process 160 receives address data 152, and obtains geo-coordinates of a point within the polygon, and identifies an address at the geo-coordinates. That is, process 160, having reference to geo coordinates reference database 165, retrieves geographical coordinates, (e.g. latitude and longitude), for each of the addresses, and then retrieves from business entity reference database 185 the address or addresses associated

TABLE 11

| Segment ID | Geo Area ID | Road Name | From # | From Lat/Long | To # | To Lat/Long |
|---|---|---|---|---|---|---|
| 53AA9BCBB7BF | FF2E | Route 10 | 120 | D17DD2F7 | 160 | F66C7FA6 |
| 60C883DB7C6C | 3B57 | US 1 | 12 | 60ED05CC | 1200 | 551D0DC2 |
| 42A021CA8914 | 5CAE | Smith Avenue | 1 | 77EABD92 | 43 | 97DC4E06 |
| 42365F645E94 | 5A94 | Main Street | 10 | 1337CDF4 | 460 | A5302FD7 |
| CCEC8F47EDCE | 75CE | NULL | 0 | CE958552 | 0 | F3E18C19 |

Table 11 shows an example of addresses existing along particular segments (shown in the first column) as a collection of attributes including street number ranges (columns 4 and 6), street names (column 3) and Cartesian coordinates of the segment terminators (shown in encoded format in columns 5 and 7).

An example of perimeter reference data within segment reference database 155 may include the information in TABLE 12.

TABLE 12

| Shape ID | Type | Coordinate Hash |
|---|---|---|
| 0A4E98F3 | Point | 37CE17DF782339B2 |
| 3D139E4D | Polygon | D956C0BCCD601FEA |
| B12AE4CE | LineString | E82354DBD99B91DF |
| DBF8F7DD | Polygon | DA0C535E76DC4F38 |

Table 12 shows an example of a representation of perimeter reference data, with a unique identifier for each perimeter (column 1), a description of the type of perimeter (column 2) and an encoded version of the Cartesian coordinates of the perimeter (column 3).

Consider again some of the operations performed by processes 140 and 150 in order to define the polygon. Process 140, during the extrapolation process, obtains a first attribute associated with the address (for example, 123 Cecil Avenue, which is an address at one end of a segment). Process 150, when identifying the segment, obtains a second attribute associated with the segment (for example, that addresses on the segment have floor numbers associated with them), and then, to define the polygon, defines a size and a shape of the polygon based on the first and second attributes. An example of the definition of the polygon would be for process 150 to use the first attribute and the second attribute to construct one side of the polygon to run the entire length of the segment.

As mentioned above, a multi-story office building may be viewed as a vertical location. In such a case, process 150, instead of merely defining a polygon, would instead define a with each of those coordinates, thus yielding address data 162. In this manner process 160 identifies other existing address values for extruded value 142.

An example of the other addresses in address data 162 identified by process 160 from address data 152 and geo coordinates reference database 165 may include the information in TABLE 13.

TABLE 13

| Extruded Address (from Extruded Values 142) | Lat/Long Value | Other Address Values (to Address data 162) |
|---|---|---|
| 121 Main Street | −67.534, 61.968 | 525A Elm Ave |
|  |  | 525B Elm Ave |
| 123 Main Street | −44.537, −52.324 |  |
| 125 Main Street | 50.828, 60.955 |  |
| 127 Main Street | 28.656, −63.131 | 1 ABC Plaza |
| 129 Main Street | 34.928, −19.079 |  |
| 131 Main Street | −67.534, 61.968 | 18 Corner Street |
|  |  | 20 Corner Street |

Method 100 progresses from process 160 to process 170.

Process 170 receives as input, address data 162, and identifies an entity that is associated with the address at the geo-coordinates. More specifically, process 170 receives the set of geocodes (data pertaining to geospatial locations such as latitude and longitude) which are attributes of the addresses in address data 162, and performs retrieval of businesses associated with those addresses by the employment of various modalities of match processes from business entity reference database 185, thus yielding address data 172. Business entity reference database 185 may or may not have a business associated to each address resulting from process 160.

The output of process 170 is the attribution of business entity data to address data 162 to create address data 172.

An example of a subset of address data retrieved from business entity reference database 185 employing addresses resulting from process 160 and added to address data 172 may include the information in TABLE 14. "HQ" is an abbreviation for "headquarters".

TABLE 14

| Geocode from process 160 | Address retrieved from business entity reference database 185 | Retrieved business name from business entity reference database 185 (added to Address data 172) |
|---|---|---|
| 87.284, −25.211 | 121 Main Street | ABC Automobile Sales |
| −66.789, −43.111 | 525A Elm Street | Joe's Pizza |
| 54.39, 5.426 | 525B Elm Street | <no business> |
| 68.649, 54.966 | 123 Main Street | <no business> |
| 70.807, −43.812 | 125 Main Street | ABC Corporate HQ |
| −67.399, −23.047 | 127 Main Street | <no business> |
| −81.73, 49.476 | 1 ABC Plaza | ABC Finance Division |
| 16.153, −67.527 | 129 Main Street | <no business> |
| 21.82, 5.124 | 131 Main Street | ABC Automobile Repair |
| 13.322, −71.755 | 18 Corner Street | Mary's Takeout Kitchen |
| 86.351, 4.892 | 20 Corner Street | <no business> |

Method 100 progresses from process 170 to process 180.

Process 180 receives address data 172, and using the addresses in address data 172 as inputs, employs various methodologies (such as text-based lookups) to discerns candidates (i.e., entities similar to the entities associated to addresses in address data 172) in business entity reference database 185, thus yielding a dataset 182.

TABLE 15 shows an example of dataset 182 produced by process 180 from business entity reference database 185.

TABLE 15

| Address from process 170 (address data 172) | Variants generated by process 180 | Retrieved business names from business entity reference database 185 (added to dataset 182) |
|---|---|---|
| 121 Main Street, Short Hills | 1. 12* Main, 07078<br>2. 1** Main, Short Hills<br>3. nnn MN, XRTHLS | ABC Automobile Sales<br>Joe's Pizza<br>ABC Corporate HQ<br>ABC Automobile Repair |
| 525A Elm Street, Short Hills | 52* Elm, 07078<br>5** Elm, Short Hills<br>Nnnn ELM, XRTHLS | Joe's Pizza |
| 18 Corner Street, Short Hills | 1* Corner, 07078<br>1* Cnr, 07078<br>nn KRNR, XRTHLS | Mary's Takeout Kitchen |

Process 181 is a recursive process that instantiates processes 150 through 180 in a recursive fashion until one or more of a defined set of criteria are met, for example, a retrieval iteration falls below certain quantitative and qualitative levels. The result is candidate list 189.

TABLE 16 provides example of quantitative and qualitative criteria that may be used in process 181.

TABLE 16

| Criteria Type | Criteria Definition |
|---|---|
| Quantitative criteria | Maximum of 50 candidate records<br>Maximum response time of .1 seconds<br>Maximum of 25 records |
| Qualitative criteria | Candidate must be a headquarters (i.e., a branch office is not acceptable) |

Method 100 progresses from process 180 to process 193, shown in FIG. 1B. Candidate list 189 is represented in both of FIGS. 1A and 1B.

Process 193 receives candidate list 189, and uses scoring rules 190 to produce a qualitatively differentiated list of candidates, thus yielding a list 193A. Examples of scoring rules 190 may include rules that discriminate using scores based on, inter alia, (a) the nature of the retrieval modalities used in processes 150 through 180 to include a particular address entry or business entity in candidate list 189 (that is, what method or combinations of methods were employed in the discernment of individual candidates in candidate list 189) and (b) the extent of extrapolation (for example whether a particular address was retrieved by the direct operation of a retrieval modality upon inquiry 110 or instead upon an address that had itself been retrieved in a prior iteration of recursive process 181) or abstraction (for example, the distance in meters that a retrieved address lies from a nominal set of coordinates associated with inquiry 110) used in the retrieval modalities.

Process 193 employs a relative weighting approach based on geo entity attribute table 137 and scoring rules 190, to yield a set of weighted sub-scores for each entry in candidate list 189 which sub-scores are used in qualitatively ranking candidate list 189. This weighting considers multiple characteristics regarding metadata and actual data values so that a weighting for a candidate may consider criteria such as the iteration sequence that produced the candidate, the retrieval modality or modalities used in the discernment of the candidate (and which may include matrices that assign scores to combinations of retrieval modalities, iteration numbers etc), and other qualitative assessments of the similarity between each entry on candidate list 189 and the source inquiry 110 (for example a measure of the edit distance between the street name of inquiry 110 and the entry in candidate list 189). For example, a candidate $C_1$ retrieved using both segmentation analysis (process 150) and name-based retrieval (processes 170 and 180) may receive score 100 for sub-score $S_1$ whereas candidate $C_2$ retrieved using geo coordinate-based retrieval (process 160) only may receive score 90 for sub-score $S_1$.

TABLE 17 is an example of weighted sub-scores used by scoring rules 190 and process 193.

TABLE 17

| Candidate | Geolookup intersection score | Density Score | Geolookup Corroboration Score | Origination/ Extrusion Score |
|---|---|---|---|---|
| C001 | 59 | 18 | 34 | 57 |
| C002 | 12 | 52 | 42 | 76 |
| C003 | 77 | 78 | 2 | 15 |
| C004 | 86 | 44 | 76 | 79 |
| C005 | 91 | 75 | 71 | 96 |

For the preceding table, column 1 refers to a candidate in candidate list 189 and the remaining columns represent scores based on the interactions of retrieval modalities in the discernment of the candidate (column 2), an assessment of the building density of the candidate address (column 3), degree of corroboration of address by multiple geospatial location methodologies (column 4), and a score showing the level of extrapolation or abstraction associated with the specific retrieval methodologies employed to discern the candidate (column 5).

The set of sub-scores generated in process 193 (and exemplified in Table 17) for each candidate will in turn be arranged and scored using ranking rules 191.

TABLE 18 is an example of the final outcome of the execution of ranking rules 191.

TABLE 18

| Candidate | Weighted Rank |
|---|---|
| C005 | 1 |
| C004 | 2 |
| C002 | 3 |

TABLE 18-continued

| Candidate | Weighted Rank |
| --- | --- |
| C001 | 4 |
| C003 | 5 |

Method 100 progresses from process 193 to process 194.

Process 194 receives the scored candidate list, i.e., list 193A, from process 193, and refines list 193A by removing those candidates whose rank, scores, sub-scores or a combination thereof do not meet inclusion and/or exclusion criteria defined in decisioning rules 192, thus yielding a list 194A.

TABLE 19 is an example of the relative weighting of scoring factors used in process 194.

TABLE 19

| Factor/Score | Weighting |
| --- | --- |
| Geolookup intersection score | 0.5 |
| Density Score | 0.25 |
| Geolookup Corroboration Score | 0.6 |
| Origination/Extrusion Score | 0.33 |

TABLE 20 is an example of inclusion/exclusion rules in process 194.

TABLE 20

| Rule | Impact |
| --- | --- |
| No Geo Code can be generated | Exclude |
| Density Score < 20 AND Origination/Extrusion Score < 50 | Exclude |

TABLE 21 is an example of the results of process 194, namely list 194A.

TABLE 21

| Candidate | Weighted Rank | Rules Result |
| --- | --- | --- |
| C001 | 4 | PASS |
| C002 | 3 | FAIL |
| C003 | 5 | FAIL |
| C004 | 2 | PASS |
| C005 | 1 | PASS |

Method 100 progresses from process 194 to process 195.

Process 195 receives list 194A, i.e., the qualified list of candidates $C_1 \ldots C_T$, where $C_T$ is the lowest-quality candidate deemed acceptable for inclusion in the results to be returned by method 100.

TABLE 22 is an example of the resultant candidate list 189, with candidates C002 and C003 excluded because they failed rules execution, even though they both scored at a level that met qualitative acceptance criteria:

TABLE 22

| Candidate | Weighted Rank | Business Name |
| --- | --- | --- |
| C001 | 4 | ABC Automobile Sales |
| C004 | 2 | Joe's Pizza |
| C005 | 1 | ABC Corporate HQ |

Process 195 assembles and returns result 196, which includes a candidate list 197 and feedback 198. Feedback 198 is information regarding a degree of similarity between inquiry 110 and each candidate within candidate list 197.

Feedback 198 is included in result 196 to indicate the quality of each candidate within candidate list 197, e.g., a level of confidence that best candidate $C_n$ is a business entity located at the address location(s) attributed to inquiry 110. Feedback 198 may also include a relative degree of similarity as expressed by a relative correlation between each field in data 122 and each component of each candidate within candidate list 197, as well as the source of the specific data that was used to populate business entity reference database 185 with components of each candidate in candidate list 197.

TABLE 23 is an example of feedback 198.

TABLE 23

| Business Name | Address | Similarity Score | Correlation Feedback | Geo Feedback |
| --- | --- | --- | --- | --- |
| ABC Automobile Sales | 121 Main Street, Short Hills NJ 07078 | 88 | ABZFA | 2AC |
| Joe's Pizza | 525A Elm Street, Short Hills NJ 07078 | 67 | BBZZZ | 6HA |
| ABC Corporate HQ | 125 Main Street, Short Hills NJ 07078 | 97 | AAABB | 3AA |

Table 23 shows a business entity (column 1), an address associated with that entity (column 2), a score representing the similarity of that address to a candidate in candidate list 197 (column 3), a string of characters with embedded meaning representing the nature of the similarity (also referred to as correlation) of address (column 4) and a string containing embedded meaning which describes attributes of the address (column 5).

Thus, in brief, method 100 includes 1) receiving an inquiry to initiate a search for business entities, each of which is associated with a specific geographical locale, 2) cleansing, parsing and standardizing the inquiry, 3) extruding additional addresses based on an inquiry address, 4) determining optimal methods to search reference databases based on single or a plurality of cleansed, parsed, and standardized inquiry indicia, 5) retrieving candidates and selecting reference database entities that match the inquiry, and 6) returning the candidates from the reference database based on a degree of similarity to the inquiry or data derived from the inquiry, with feedback regarding the degree of similarity.

Process 100 includes steps to 1) receive input data comprising a search string having a plurality of elements, 2) convert a subset of the plurality of elements to a set of terms, 3) retrieve stored reference data based on the terms to identify most likely candidates for match to the input data, 4) infer predictiveness of the ability to identify a set of match candidates using flexible indicia based on an end-user inquiry including both data that is expected as part an inquiry, alternative data that may be provided by the end-user, and data that is derived from the inquiry data, 5) select one or more match candidates based on the inferred predictiveness, and 6) provide match results and feedback that allow the end-user to decide how to use those results.

Method 100 includes functionality to identify business entities associated with geographical locales using a finite but temporally unbounded set of indicia that can be used by the subprocesses within method 100 to form an opinion of similarity between an inquiry and match candidates. Method 100 addresses certain inherent problems in uniquely recognizing and qualifying a geographical locale and its association to one or more business entities including 1) imprecision and natural variation in the conceptualization and expression of geographical address indicia, 2) the absence of unambiguous identifiers or persistent keys for geographical locales, and 3) very wide variances in the level of detail commonly considered in business use to comprise a "complete" address. By extending a flexible and variable set of identification and match attributes to a geographical locale, these challenges can be addressed. The flexibility of the technique includes both metadata and actual data values, and would be used in both 1) populating a database with information related to geographical locales and connections between geographical locales and business entities, as well as 2) selecting business entities from the database based on an inquiry and rules governing the threshold of acceptance for given purposes.

Method 100 can resolve a case of a single entity at a location, e.g., a single entity in a single building, or a case of multiple entities at the single location, e.g., multiple tenants in a shopping mall. For the case of multiple entities at the single location, each of the entities may nevertheless have an address that is different from that of the other entities.

For the case of a single entity, method 100:
(a) in process 120, receives data, i.e., inquiry 110, that describes a location;
(b) in process 140, extrapolates, from the data, an address associated with the location;
(c) in process 150, identifies a segment of a thoroughfare that includes the address;
(d) in process 150, defines a polygon that has a perimeter that encompasses a geographic region that is in a vicinity of the segment;
(e) in process 160, obtains geo-coordinates of a point within the polygon;
(f) in process 160, identifies an address at the geo-coordinates; and
(g) in process 170, identifies an entity that is associated with the address at the geo-coordinates.

For the case of multiple entities at the single location, consider a situation of two entities who are tenants in a shopping mall, where each entity has an address that is different from that other entity. In process 150, the polygon would have a perimeter that encompasses the shopping mall. Accordingly, assume that the aforementioned geo-coordinates are first geo-coordinates, the aforementioned point is a first point, the aforementioned address at the geo-coordinates is a first address at the geo-coordinates, and the aforementioned entity is a first entity. When process 160 is executed, it obtains second geo-coordinates of a second point within the polygon, and identifies a second address at the second geo-coordinates. Process 170 then identifies a second entity that is associated with the second address.

Figure 2:
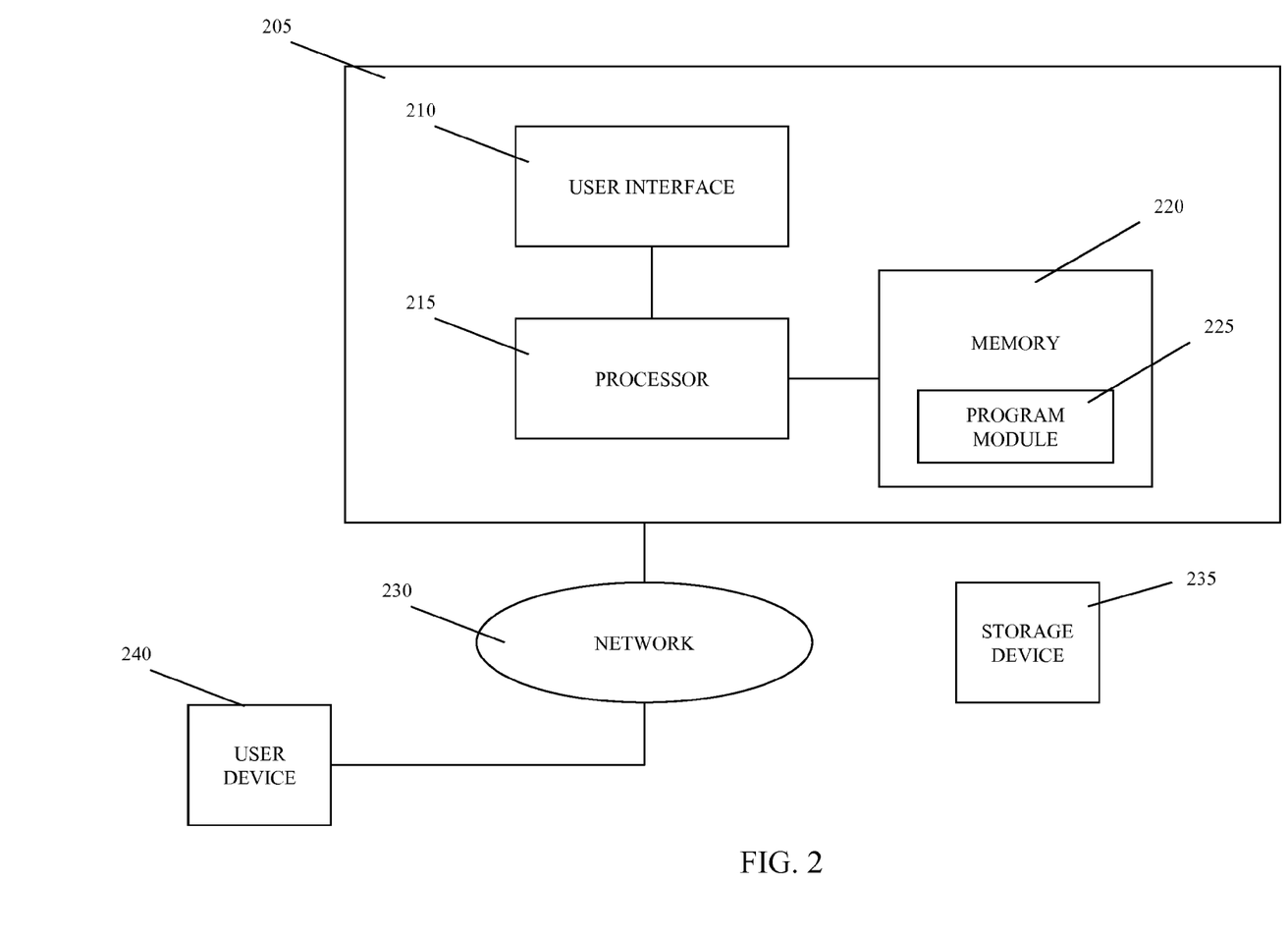
FIG. 2 is a block diagram of a system that employs the methods described herein.

FIG. 2 is a block diagram of a system 200 that employs the methods described herein. System 200 includes a computer 205 coupled to a data communications network, i.e. a network 230, such as the Internet.

Computer 205 includes a user interface 210, a processor 215, and a memory 220. Although computer 205 is represented herein as a standalone device, it is not limited to such, but instead can be coupled to other devices (not shown) in a distributed processing system.

User interface 210 includes an input device, such as a keyboard or speech recognition subsystem, for enabling user 101 to communicate information and command selections to processor 215. User interface 210 also includes an output device such as a display or a printer. A cursor control such as a mouse, track-ball, or joy stick, allows user 101 to manipulate a cursor on the display for communicating additional information and command selections to processor 215.

System 200 also includes a user device 240 that is communicatively coupled to computer 205 via network 230. User 101 can interact with computer 205 by way of user device 240, as an alternative to doing so by way of user interface 210.

Processor 215 is an electronic device configured of logic circuitry that responds to and executes instructions.

Memory 220 is a non-transitory computer-readable device encoded with a computer program. In this regard, memory 220 stores data and instructions that are readable and executable by processor 215 for controlling the operation of processor 215. Memory 220 may be implemented in a random access memory (RAM), a hard drive, a read only memory (ROM), or a combination thereof. One of the components of memory 220 is a program module 225.

Program module 225 contains instructions for controlling processor 215 to execute the methods described herein. For example, under control of program module 225, processor 215 executes the processes of method 100. The term "module" is used herein to denote a functional operation that may be embodied either as a stand-alone component or as an integrated configuration of a plurality of sub-ordinate components. Thus, program module 225 may be implemented as a single module or as a plurality of modules that operate in cooperation with one another. Moreover, although program module 225 is described herein as being installed in memory 220, and therefore being implemented in software, it could be implemented in any of hardware (e.g., electronic circuitry), firmware, software, or a combination thereof.

Processor 215 receives inquiry 110, either through network 230 or user interface 210. Processor 215 accesses processing rules 135, geo entity attribute table 137, extrusion rules 145, segment reference database 155, geo coordinates reference database 165, and business entity reference database 185, scoring rules 190, ranking rules 191, and decisioning rules 192, which can be components of computer 205, for example, stored within memory 220, or can be external to computer 205 where computer 205 accesses them via a local network (not shown), or via network 230. Processor 215 accesses processes 120, 130, 140, 150, 160, 170, 180, 181, 193, and 194 which can be components of computer 205, for example, stored within memory 220, or can be external to computer 205 where computer 205 accesses them via a local network or via network 230. Processor 215 returns result 196 to user 101 in process 195.

While program module 225 is indicated as already loaded into memory 220, it may be configured on a storage device 235 for subsequent loading into memory 220. Storage device 235 is also a non-transitory computer-readable device encoded with a computer program, and can be any conventional storage device that stores program module 225 thereon. Examples of storage device 235 include a floppy disk, a compact disk, a magnetic tape, a read only memory, an optical storage media, universal serial bus (USB) flash drive, a digital versatile disc, or a zip drive. Storage device 235 can also be a random access memory, or other type of electronic storage, located on a remote storage system and coupled to computer 205 via network 230.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A method comprising:
   (a) receiving data that describes a location;
   (b) extrapolating, from said data, an address associated with said location;
   (c) executing a process that yields a candidate list, wherein said process includes:
      identifying a segment of a thoroughfare that includes said address;
      obtaining geo-coordinates of a point that corresponds to said address;
      defining a polygon that has a perimeter that encompasses a geographic region that includes said geo-coordinates;
      identifying an entity that is associated with said address at said geo-coordinates;
      including said entity in said candidate list; and
      identifying an additional address encompassed by said polygon;
   (d) sending said additional address recursively into said process until a criterion is satisfied; and
   (e) returning said candidate list.

2. The method of claim 1,
   wherein said extrapolating includes obtaining a first attribute associated with said address,
   wherein said identifying said segment includes obtaining a second attribute associated with said segment, and
   wherein said defining comprises defining a size and a shape of said polygon based on said first and second attributes.

3. The method of claim 1,
   wherein said extrapolating includes obtaining a first attribute associated with said address,
   wherein said identifying said segment includes obtaining a second attribute associated with said segment,
   wherein said method further comprises, prior to said obtaining, defining a size and shape of a polyhedron based on said first and second attributes, and
   wherein said polygon is a cross-section of a polyhedron.

4. A system comprising:
   a processor; and
   a memory that is communicatively coupled to said processor, and that contains instructions that are readable by said processor to cause said processor to perform actions of:
   (a) receiving data that describes a location;
   (b) extrapolating, from said data, an address associated with said location;
   (c) executing a process that yields a candidate list, wherein said process includes:
      identifying a segment of a thoroughfare that includes said address;
      obtaining geo-coordinates of a point that corresponds to said address;
      defining a polygon that has a perimeter that encompasses a geographic region that includes said geo-coordinates;
      identifying an entity that is associated with said address at said geo-coordinates;
      including said entity in said candidate list; and
      identifying an additional address encompassed by said polygon;
   (d) sending said additional address recursively into said process until a criterion is satisfied; and
   (e) returning said candidate list.

5. The system of claim 4,
   wherein said extrapolating includes obtaining a first attribute associated with said address,
   wherein said identifying said segment includes obtaining a second attribute associated with said segment, and
   wherein said defining comprises defining a size and a shape of said polygon based on said first and second attributes.

6. The system of claim 4,
   wherein said extrapolating includes obtaining a first attribute associated with said address,
   wherein said identifying said segment includes obtaining a second attribute associated with said segment,
   wherein said method further comprises, prior to said obtaining, defining a size and shape of a polyhedron based on said first and second attributes, and
   wherein said polygon is a cross-section of a polyhedron.

7. A storage device comprising instructions that are readable by a processor to cause said processor to perform actions of:
   (a) receiving data that describes a location;
   (b) extrapolating, from said data, an address associated with said location;
   (c) executing a process that yields a candidate list, wherein said process includes:
      identifying a segment of a thoroughfare that includes said address;
      obtaining geo-coordinates of a point that corresponds to said address;
      defining a polygon that has a perimeter that encompasses a geographic region that includes said geo-coordinates;
      identifying an entity that is associated with said address at said geo-coordinates;
      including said entity in said candidate list; and
      identifying an additional address encompassed by said polygon;
   (d) sending said additional address recursively into said process until a criterion is satisfied; and
   (e) returning said candidate list.

8. The storage device of claim 7,
   wherein said extrapolating includes obtaining a first attribute associated with said address,
   wherein said identifying said segment includes obtaining a second attribute associated with said segment, and
   wherein said defining comprises defining a size and a shape of said polygon based on said first and second attributes.

9. The storage device of claim 7,
   wherein said extrapolating includes obtaining a first attribute associated with said address,
   wherein said identifying said segment includes obtaining a second attribute associated with said segment,
   wherein said method further comprises, prior to said obtaining, defining a size and shape of a polyhedron based on said first and second attributes, and
   wherein said polygon is a cross-section of a polyhedron.

* * * * *